Jan. 1, 1963 R. W. KLING 3,071,414
BOTTOM DUMPING HOPPER VEHICLE
Filed Feb. 7, 1958 7 Sheets-Sheet 1

INVENTOR.
Robert W. Kling
BY
Horton, Davis, Brewer & Brugman
Attorneys

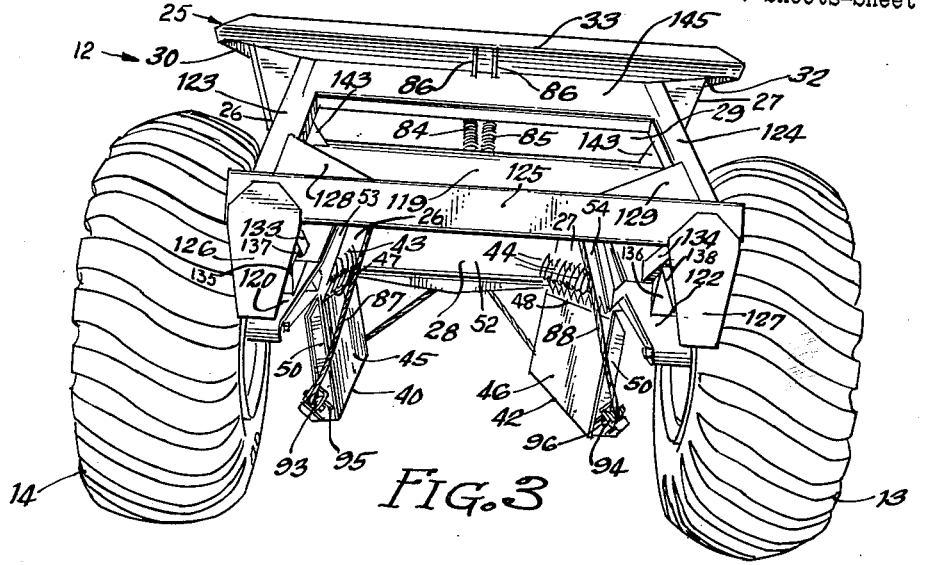
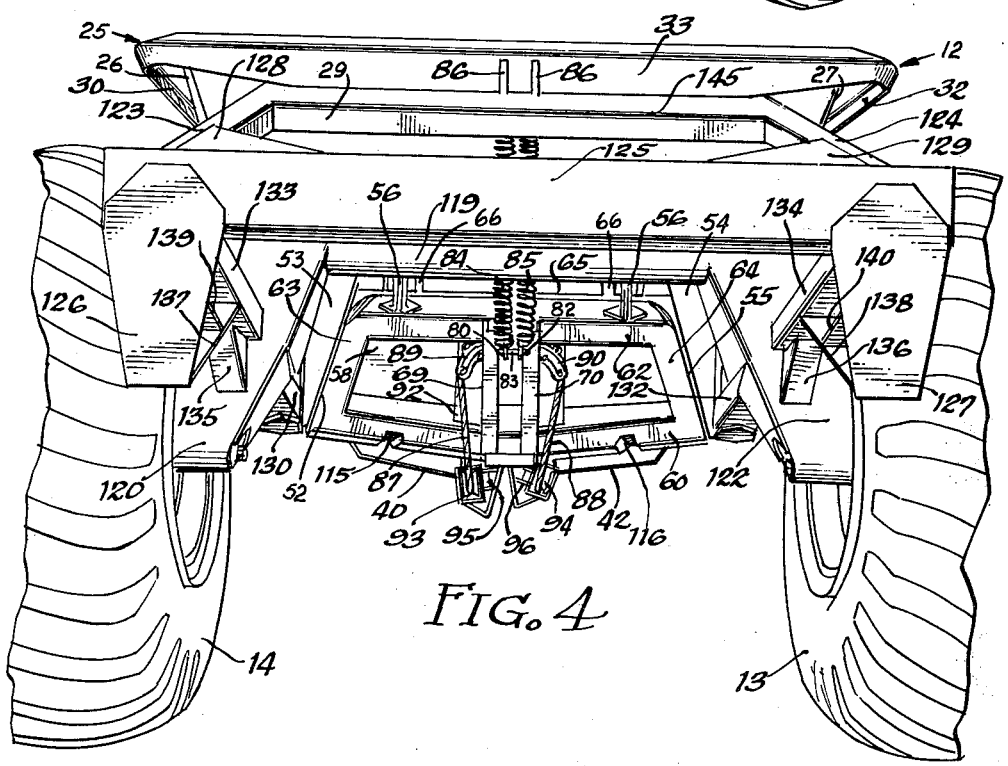

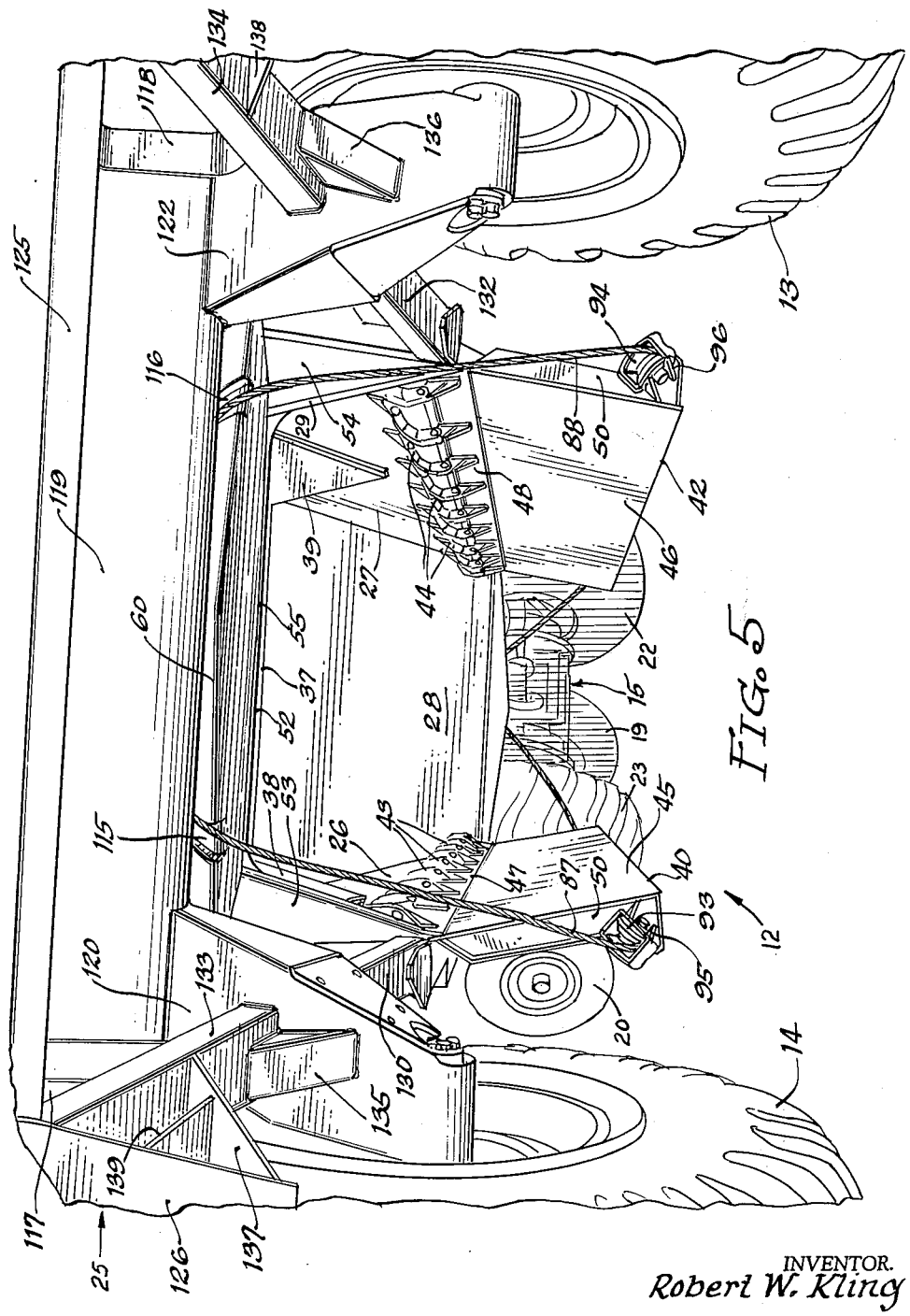

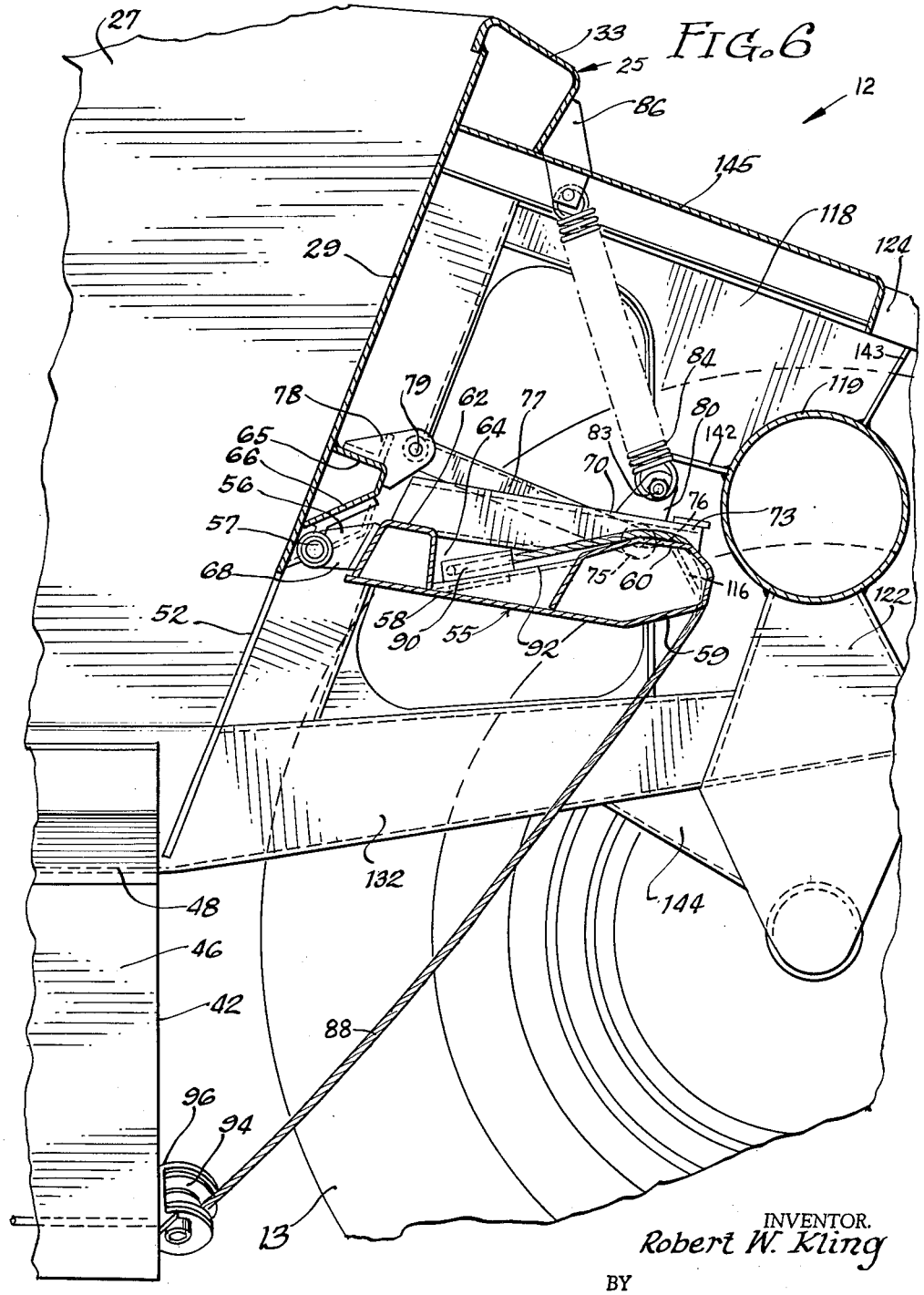

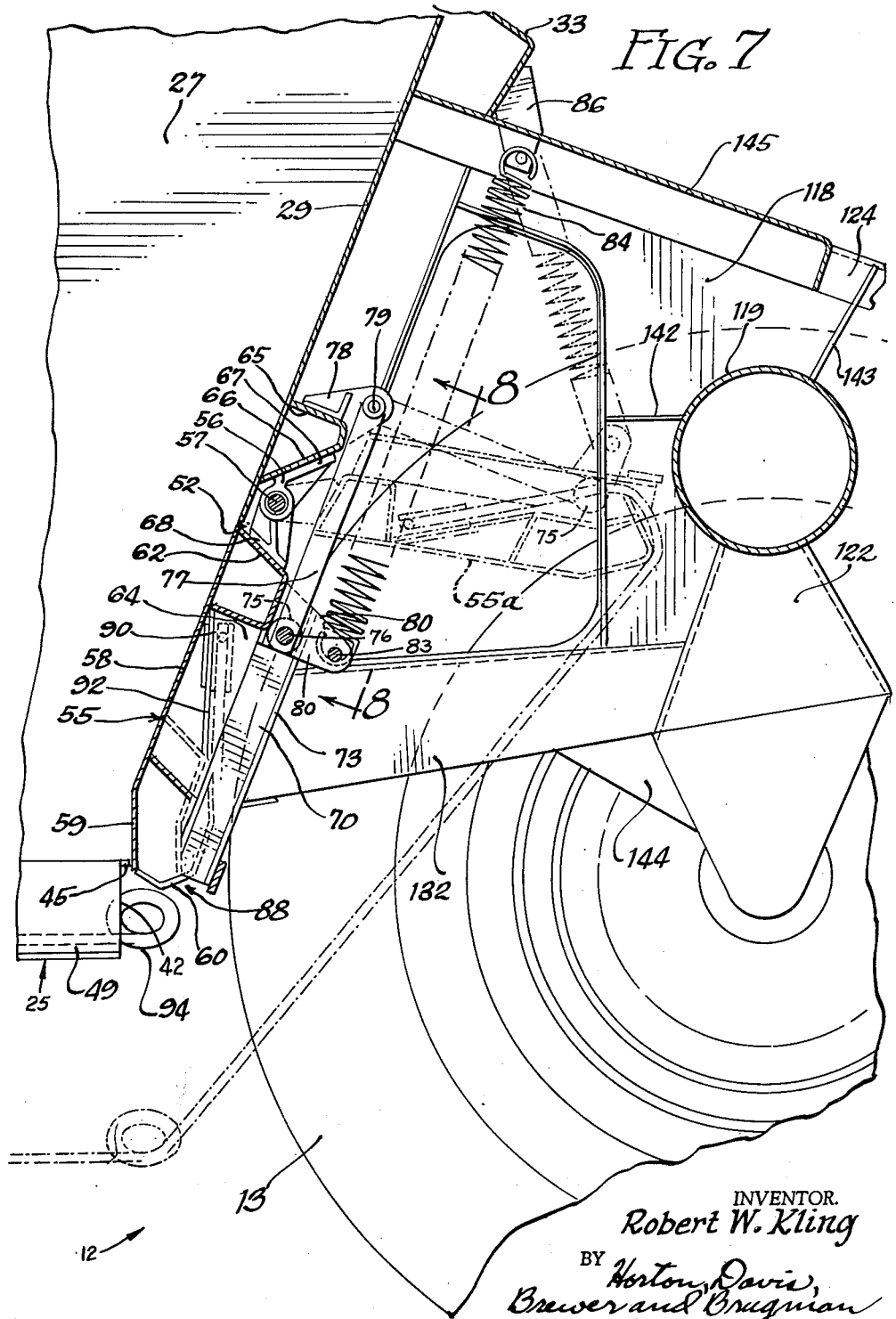

Jan. 1, 1963  R. W. KLING  3,071,414
BOTTOM DUMPING HOPPER VEHICLE
Filed Feb. 7, 1958  7 Sheets-Sheet 6

INVENTOR.
Robert W. Kling
BY
Horton, Davis, Brewer and Brugman
Attorneys

INVENTOR.
Robert W. Kling
BY Horton, Davis,
Brewer & Brugman
Attorneys

United States Patent Office 3,071,414
Patented Jan. 1, 1963

3,071,414
BOTTOM DUMPING HOPPER VEHICLE
Robert W. Kling, Wilmette, Ill., assignor to Athey Products Corporation, Chicago, Ill., a corporation of Illinois
Filed Feb. 7, 1958, Ser. No. 713,897
8 Claims. (Cl. 298—35)

This invention relates to bottom dump vehicles, and more particularly to such vehicles which not only provide for rapid dumping of a load, but which also provide large load clearance, so that the vehicle can readily be moved from a dumped load without appreciably spreading the material which has been dumped.

One of the objects of this invention is to provide a bottom dump load hauling vehicle having gate means at the rear thereof which is operable at the time of dumping the load to afford large clearance for moving the vehicle from a dumped load.

Another object of my invention is to provide a bottom dump load hauling vehicle having a rear door that swings upwardly to a level materially above the openable bottom and wherein the openable bottom and rear door are operated together for opening and closing in predetermined sequence by common actuating means.

This invention further has within its purview the provision of a bottom dump load hauling vehicle having both bottom and rear doors actuated by cable means between closed and open positions and wherein the movements of the doors effect a spreading of the cables during dumping to provide load clearance.

My invention also comprehends a dumping vehicle having bottom and rear doors openable for dumping, the bottom doors being moved toward the open position by gravity and the rear door being lifted upwardly by mechanical force applying means after the bottom doors have opened.

It is another object of the invention to provide a mechanism for operating bottom and rear doors of a load hauling vehicle in a sequence such that the rear door not only opens after the bottom doors have been opened, but also is closed prior to the closing of the bottom doors.

The invention further comprehends the provision of a bottom dump load hauling vehicle wherein the supporting structure is constructed and arranged to provide clearance for large dumped loads.

Other objects and advantages of the invention will be apparent from the following description and the accompanying drawings in which similar characters of reference indicate similar parts throughout the several views.

Referring to the drawings of which there are six sheets:

FIGS. 1 and 2 are side elevational views of a bottom dump load hauling vehicle embodying a preferred form of my invention and wherein FIG. 1 shows the vehicle as it appears for hauling a load, while FIG. 2 shows parts of the vehicle in a load dumping position;

FIG. 3 is a rear perspective view of the vehicle shown in FIGS. 1 and 2 with the parts in position for dumping a load;

FIG. 4 is a fragmentary rear perspective view somewhat similar to FIG. 3, but showing the vehicle as it appears for hauling a load;

FIG. 5 is a fragmentary rear perspective view of the vehicle similar to FIG. 3, but taken from a position below that from which FIG. 3 is taken, thereby to depict some additional and different portions of the structure;

FIG. 6 is a fragmentary side sectional view of a rear portion of the vehicle with parts illustrated in load dumping positions;

FIG. 7 is a fragmentary side sectional view similar to FIG. 6, but indicating the positions of parts in their load hauling positions by solid lines and depicting the dumping positions of certain of the parts by dot and dash lines;

Figure 1:
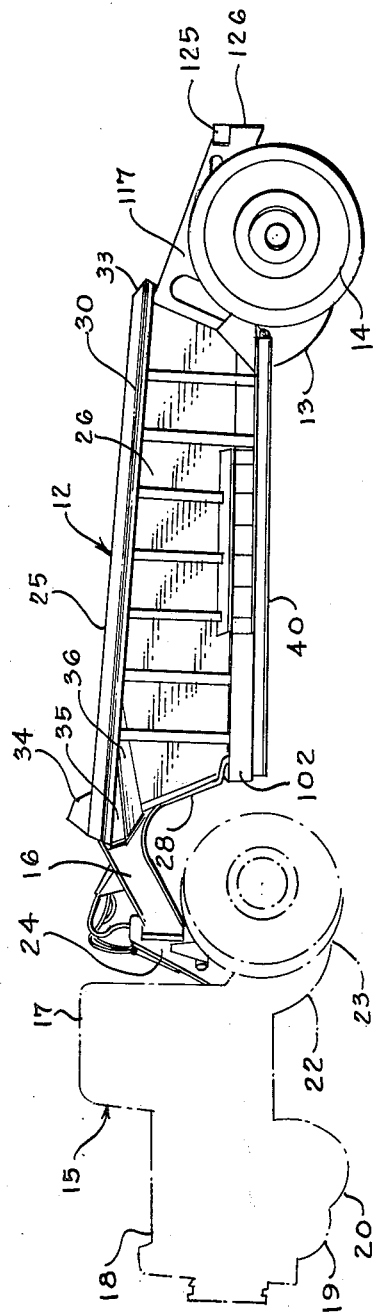

Although not necessarily limited thereto, the exemplary embodiment of this invention which is depicted herein for illustrative purposes shows a bottom dump load hauling vehicle 12 in the form of a trailer having wheels 13 and 14 at the rear end thereof and having its front end connected to a tractor 15 through a gooseneck 16 for supporting the front end of the trailer and for effecting motivation thereof. The tractor 15 is of a relatively conventional type; the one herein depicted having an operator's cab 17, a hood 18 within which a prime mover is housed for supplying motivating power for the vehicle, front steerable wheels 19 and 20, rear driving wheels 22 and 23 and a hitch 24 through which a swivel connection is made to the front end of the gooseneck 16.

Considered generally, the trailer has a load hauling body 25 which includes spaced and opposed side walls 26 and 27, a front wall 28 adjoining the front ends of the side walls and a rear wall 29. As viewed from the top, the body is generally rectangular, and in the disclosed structure, the side walls and the end walls converge somewhat toward the bottom. The top of the body, in the illustrated structure, is open. The top edges of the side walls are reinforced and rigidified by channels 30 and 32 extending the full length of each side wall and each of which has an inner flange welded to the top of one of the side walls, so that the respective channels project outwardly and downwardly to form a rim. The rear wall 29 has a similar channel 33 extending across and secured to the top edge thereof to reinforce and rigidify that wall, and the channel 33 has its opposite ends secured to the rear ends of the channels 30 and 32. At the front of the body, a top reinforcing structure 34 is secured to and extends across the top of the front wall 28. Also, that top reinforcing structure and the front end are adjoined to the gooseneck 16, and exterior reinforcing plates 35 and 36 adjoined to opposite ends of the front reinforcing structure extend rearwardly along upper portions of the side walls. The reinforcing plates 35 and 36 are secured to the top channels and to the respective side walls to provide reinforcement. Internally of the longitudinal mid portion of the side walls, as shown in FIG. 5, a divider 37 extends across the body between the top portions of the side walls and has outwardly extending end portions 38 and 39 secured to the side walls to rigidify the body structure and to prevent the side walls from bulging.

As illustrated in FIGS. 3, 4 and 5, the bottom of the body comprises two doors which are longitudinally coextensive with the side walls 26 and 27 respectively and which are movably secured to those side walls by a plurality of longitudinally spaced hinge units 43 and 44 respectively. When supported in a load hauling position, as shown in FIGS. 1 and 4, the doors 40 and 42 abut one another along a longitudinal mid line of the body to provide an effective closure and to support a load of material carried within the body. The level of the bottom of the body, as determined by the lower edges of the side walls 26 and 27, with the body normally supported by the wheels 13 and 14 and the gooseneck 16, is established to provide for movements of the doors to open positions, as shown in FIGS. 3 and 5, in which the bottom doors, for dumping purposes, extend downwardly in planes which are extensions of the planes of the inner surfaces of the side walls from which they are supported.

Figure 2:
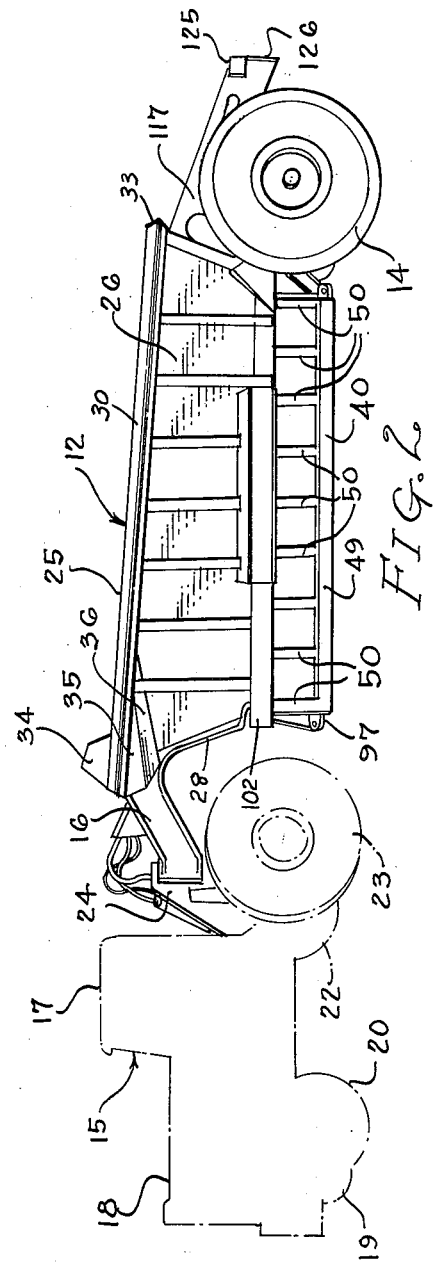

In the structure disclosed, the doors 40 and 42 have inner plates 45 and 46 respectively which provide the load supporting surfaces interiorly of the body when the doors are closed. The plates 45 and 46 are reinforced along their outer margins by plates 47 and 48 which extend longitudinally of the respective doors 40 and 42, and to which plates portions of each of the hinges 43 and 44 are secured. Additional reinforcement is provided exteriorly of the plates 45 and 46 by channels, such as 49 (FIG. 2) which extend longitudinally of the inner margins of the doors remote from the hinged edges. Each door is further reinforced by longitudinally spaced channels 50 secured to the external surfaces of the plates and to the longitudinal channels 49, and which channels 50 extend laterally of the outer surfaces of the doors.

To eliminate a difficulty common to many bottom dump vehicles, the disclosed structure has the rear wall 29 cut away at the bottom to provide an opening 52 in the mid region of that rear wall, which opening extends upwardly from the level of the bottoms of the other walls to a height materially above that bottom level and sufficient to afford clearance at the rear of the vehicle for the movement of the vehicle forwardly away from a dumped load without scraping across and spreading the load of material after it is dumped. As shown in FIG. 5, the rear wall extends downwardly at 53 and 54 on opposite sides of the opening 52 to provide reinforcement for the lower portions of the rear ends of the side walls 26 and 27. As may be readily understood, granular material and the like, when dumped, spreads toward the bottom of the dumped pile, so that the inward taper of the rear opening 52 toward the top thereof does not cause the wall to contact the material in any usual dumped pile.

As shown in FIGS. 6 and 7, a rear door 55 is movably supported on hinges 56 for swinging movement relative to a hinge axis 57 (FIG. 7) extending laterally of the rear wall 29 at the top of the opening 52. This door 55 is swingable between a closed position depicted in solid lines in FIG. 7, in which it closes the opening 52, and an open position, as illustrated in FIG. 6 and as indicated in dot and dash lines at 55a in FIG. 7. In the open position, the door extends rearwardly from the rear wall 29 at a level comparable to that of the top of the opening 52.

In the disclosed structure, the door 55 has an inner plate 58 with a bottom portion 59 bent outwardly in obtuse angular relationship to the upper portions of the plate to provide a beveled lower portion on the door which is engageable with the bottom plates 45 and 46 of the bottom doors 40 and 42 when the bottom doors are closed and when the upper portion of the rear door is in substantially flush relationship to the rear wall 29, as shown in FIG. 7. A channel 60 extends across the lower margin of the exterior surface of the plate 58 and is secured thereto, as by welding, to provide a reinforcement of box-type section. Similarly, a channel 62 is welded to the exterior surface of the door plate 58 and extends across the top of the door, and, as shown in FIGS. 4, 6 and 7, channels 63 and 64 extend along opposite sides of the exterior surface of the door plate 58 and adjoin the channels 60 and 62, thereby providing a reinforcing frame of box-type section which extends around the exterior surface of the rear door.

Adjacent the upper edge of the opening 52 and on the outer surface of the rear wall 29, a channel 65 is secured to the rear wall 29 to reinforce the rear wall across the upper portion of the door opening and to provide a mounting support for the hinges 56. As shown in FIGS. 4 and 6, the channel 65 is cut away for the mounting of each hinge and has a portion 66 bent inwardly and secured to the rear wall to provide a surface to which each hinge is secured. Thus, each hinge 56 has a portion 67 secured to an inwardly bent portion 66 (FIG. 7) of the channel 65 and a portion 68 secured to a surface of the channel 62 at the top edge of the door.

In the disclosed structure, in order to provide for quick and effective action of the doors for dumping loads from the vehicle body, mechanism is provided which accomplished opening and closing movements of the bottom and rear doors in predetermined sequence. As may be readily understood, the bottom doors 40 and 42 swing to their open positions by gravitational force and as a result of the weight of a load carried thereby. Thus, they need only be moved and held for effecting closure, while the rear door must be moved to and held in each of its extreme positions.

Figure 8:
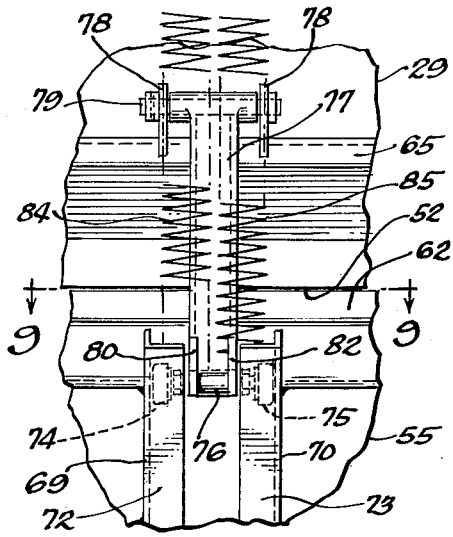
FIG. 8 is a fragmentary end elevational view of a portion of the rear part of the vehicle and is taken substantially as indicated by a line 8—8 and accompanying arrows in FIG. 7.
Figure 9:
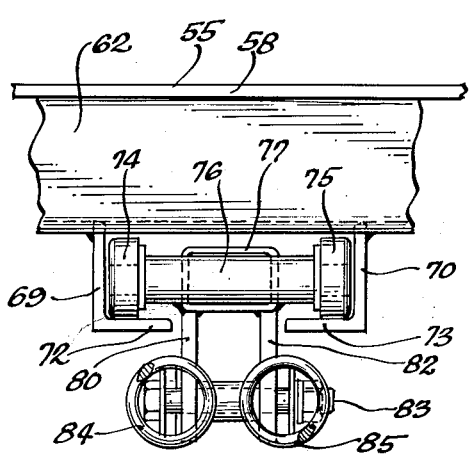
FIG. 9 is a fragmentary top sectional view taken substantially as indicated by a line 9—9 and accompanying arrows in FIG. 8.

In the illustrated structure, angle strips 69 and 70 are secured to the mid portions of the channels 60 and 62 and extend across the door 55 in spaced and opposed relationship from the top to the bottom of that door to provide a track having flanges 72 and 73 extending toward one another, as shown in FIGS. 4, 6, 7, 8 and 9. As shown in FIGS. 8 and 9, the track provided by the flanges 72 and 73 on the angles 69 and 70 affords a runway for rollers 74 and 75 which are rotatably mounted on opposite ends of a cross bar 76. The cross bar, in turn, is secured to one end of an arm 77, the other end of which arm (as shown in FIGS. 6, 7 and 8) is hingedly secured to the channel 65 on the rear wall 29 through a hinge bracket 78 and a cross pin 79. At the end of the arm 77 adjacent the cross bar 76 and the rollers 74 and 75, plates 80 and 82 are secured to the arm and project outwardly therefrom in angular relationship to the arm and away from the rear door 55. The plates 80 and 82 have a cross pin 83 secured thereto and extending therebetween, which cross pin serves as an anchor for coiled tension springs 84 and 85 which extend therefrom in spaced and substantially parallel relationship to one another. As shown in FIGS. 6 and 7, the other ends of the tension springs are anchored to the channel 33 at the top of the rear wall of the body through anchor plates 86 secured to that channel.

With the spring mechanism provided, the rear door 55 is continuously biased toward its open position by the tension springs 84 and 85. When closed, as shown in FIG. 7, the outward projection of the plates 80 and 82, to which the springs 84 and 85 are connected, determines the leverage through which the spring force is applied to the door. However, since the plates 80 and 82 are secured to the arm 77 which is swingable relative to the cross pin 79, the rollers move outwardly in the track provided by the angles 69 and 70 as the door swings toward its raised or open position and as the force of the springs 84 and 85 diminishes as a result of contraction. Thus, the leverage through which the springs act upon the doors to produce the opening movement increases as the door swings rearwardly and decreases as the door swings toward the closed position.

Figure 10:
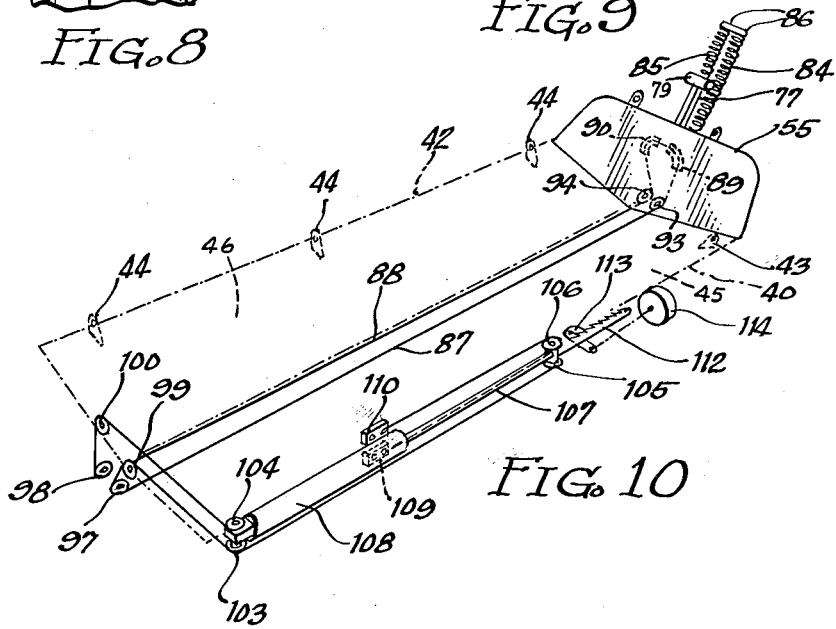
FIG. 10 is a diagrammatic view showing the mechanism of operating parts of the vehicle which function for effecting the dumping of loads from the vehicle.
Figure 11:
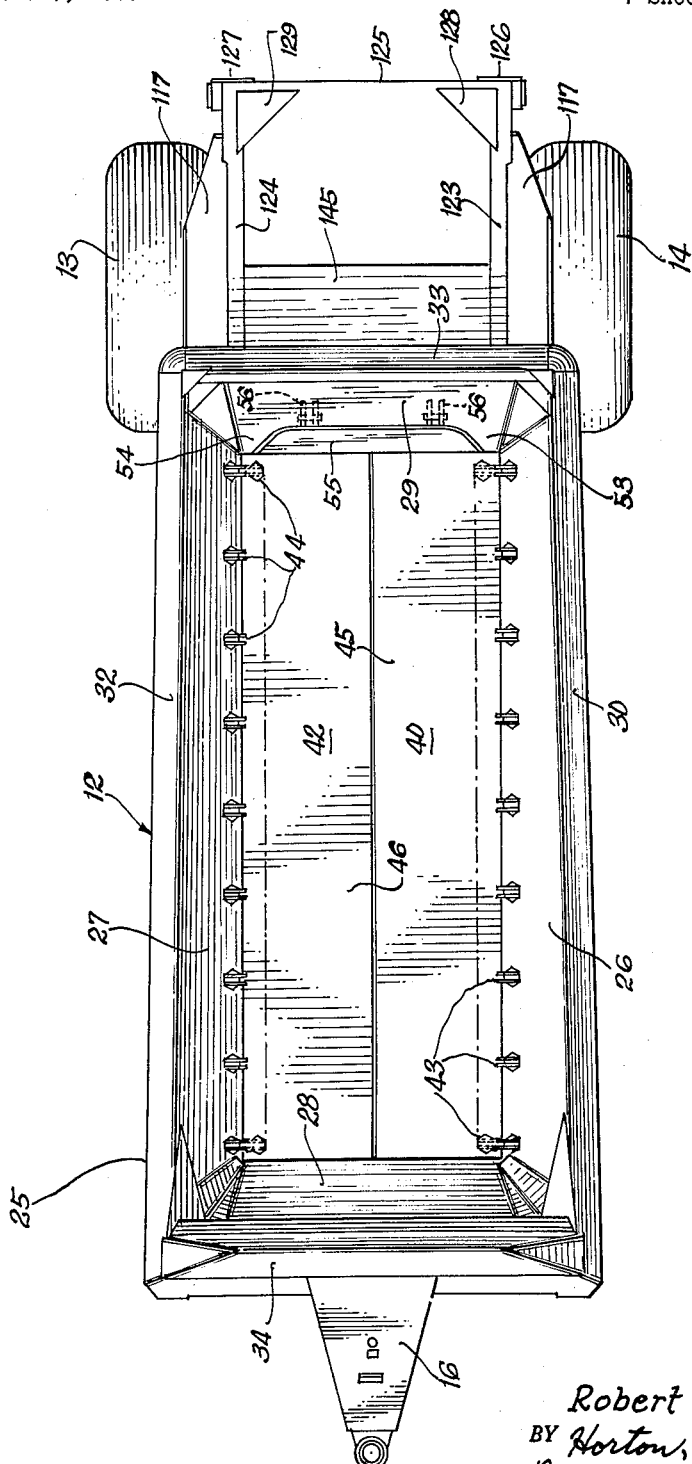
FIG. 11 is a top plan view of the vehicle.

With the bottom doors biased toward their open positions by gravitational force, and the rear door biased toward its open position by the resilient force of the springs 84 and 85, I have provided additional mechanism including flexible cables 87 and 88 for effecting actuation of the bottom and rear doors toward their closed positions and for retaining the doors in their closed positions, as well as for controlling the release of the doors for movements to their open positions. Actually, one length of cable may be utilized to serve the purpose, in which instance, as disclosed, the mid portion of the cable is anchored at the upper mid region of the outer surface of the rear door 55 by cable clamps 89 and 90 secured to a plate 92, which plate is in turn secured to and extends between the channels 62 and 60 on the outer surface of the rear door. The opposite ends of that cable extend from the clamps 89 and 90, as shown in FIGS. 4 and 10, to serve as the separate cables 87 and 88. At the rear ends of the bottom doors, sheaves 93 and 94 are secured thereto through brackets 95 and 96 respectively, which sheaves are supported in positions such that they project both rearwardly and outwardly of the bottom doors and provide guides for the cables 87 and 88. As depicted in FIG. 10, similar sheaves 97 and 98 are similarly mounted at the front ends of the bottom doors to carry the cables 87 and 88 longitudinally of the doors in spaced relationship thereto. From the sheaves 97 and 98, the cables 87 and 88 extend over sheaves 99 and 100 respectively which are rotatably mounted on the lower portion of the front wall of the body. From the sheaves 99 and 100, the cables 87 and 88 extend laterally of the body front wall through the housing 102 (FIGS. 1 and 2) and thence over sheaves 103 and 104 respectively, from whence they extend rearwardly of the body, as shown in FIG. 10, within the housing 102 and around sheaves 105 and 106 respectively which are mounted for rotation on the end of a movable piston rod 107 of a hydraulic ram 108. The ends of the cables are anchored to blocks 109 and 110 secured to the side of the body adjacent the end of the hydraulic ram 108.

With this cable arrangement, outward movement of the piston rod 107 of the hydraulic ram 108 moves the sheaves 105 and 106 rearwardly of the vehicle body, thereby to effectively shorten the lengths of the respective cables by twice the amount of the ram piston movement. This, in the disclosed structure, and with the desired relationships of the biasing forces of the springs 84 and 85 to the weights of the bottom doors 40 and 42, closes the rear door 55 against the force of the springs 84 and 85 prior to the closing of the bottom doors 40 and 42, then lifts the bottom doors, so that they swing upwardly and inwardly to their closed positions.

In order to avoid the necessity of maintaining pressure in the hydraulic ram 108 to keep the doors closed, a ratchet 112 is secured to and extends from the end of the piston rod 107 of the hydraulic ram and is engageable by a releasable locking pawl 113. When the piston rod of the ram is extended to the extent required to close the doors, the releasable locking pawl 113 will hold it in that position by engagement with the ratchet 112 until the locking pawl is released. As depicted herein, the operation of the locking pawl may be effected by a fluid actuated diaphram 114, as indicated diagrammatically in FIG. 10.

For opening the doors, the fluid pressure in the hydraulic ram is, of course, released, whereupon release of the locking pawl 113 permits the bottom doors to drop by the action of gravitational force thereon while effecting retraction of the piston rod of the ram. After the bottom doors have opened, the rear door is moved to the open position by the action of the tension springs 84 and 85. It may be observed from FIGS. 4 and 10 that when the bottom doors are closed, the cables 87 and 88 extend longitudinally of the bottom doors in closely spaced relationship near the abutting edges of the bottom doors which swing outwardly when the bottom doors open. The outward swing of the bottom doors 40 and 42 carries the cables 87 and 88 outwardly, as shown in FIG. 5, to a spread relationship in which they afford clearance for a dumped load when the vehicle is moved forwardly away from the load. As shown in FIGS. 4 and 5, the channel 60 on the rear door has notches 115 and 116 therein at spaced positions on opposite sides of the lateral center of the door in which the cables 87 and 88 become engaged during the movements of the doors, thereby to effect and insure adequate spread of the cables for load clearance.

In order to provide clearance between the rear wheels 13 and 14 of the vehicle and other clearances which are commensurate with that afforded by the provision of the opening 52 in the rear wall of the body, as well as to provide support for the body which does not limit its load carrying capacity, I have provided a rear truss structure through which the rear wheels 13 and 14 support the rear end of the body. This rear truss structure affords what may be termed an arch type of rear axle, affords bumpers from which the vehicle may be pushed when necessary and also embodies a shield for the protection of the rear door operating mechanism and other operating parts of the vehicle.

Considered in detail, the rear truss structure includes side plates 117 and 118 of generally triangular shape which are secured to and extend rearwardly from opposite sides of the rear wall 29 of the body. A relatively large torsion tube 119 extends laterally of the body between the side plates 117 and 118 near the mid portions of those side plates and is secured to the side plates by welding. At opposite ends of the lower portion of the torsion tube 119, legs 120 and 122 of box-type section are secured to the torque tube by welding and extend downwardly therefrom. At their lower ends, the torque tubes carry outwardly projecting stub axles upon which the wheels 13 and 14 are rotatably mounted.

Beams 123 and 124 extend rearwardly along the tops of the inner surfaces of the side plates 117 and 118 and are secured to those side plates. At their rear ends, the beams 123 and 124 have secured thereto a rear bumper beam 125 at a position rearward of the wheels 13 and 14. This rear bumper beam extends laterally across the rear of the truss structure to brace the structure and carries downwardly extending bumper plates 126 and 127 at its outer ends and facing rearwardly to provide bumpers against which a motivating vehicle may push this load carrying vehicle if necessary. Gusset plates 128 and 129 rigidify the inner corners between the beams 123 and 124 and the bumper beam 125. Along the inner surfaces of the bottom margins of the side plates 117 and 118, beams 130 and 132 of box-type section extend rearwardly from the rear wall 29 of the body to the legs 120 and 122 respectively and are secured to the legs, as well as to the respective side plates and the rear wall of the body. In substantial alignment with the beams 130 and 132, beams 133 and 134 of box-type section extend rearwardly from the rear surfaces of the legs 120 and 122 respectively and are secured at their ends to the rear bumper beam 125. Channel-type gussets 135 and 136 brace the corners between the beams 133 and 134 and the legs 120 and 122 respectively. Also, plates 137 and 138 extend downwardly and rearwardly from the mid regions of the beams 133 and 134 and are secured to those beams, as well as to the lower ends of the bumper plates 126 and 127. In the disclosed structure, additional brace plates 139 and 140 are secured to and extend between the mid portions of the plates 137 and 138 and the bumper plates 126 and 127 respectively. Internally of the truss structure, gusset plates such as 142 and 143 are secured to the side plates 117 and 118 and to the torque tube 119 at the opposite ends of the torque tube. As depicted, channel-type gussets 144 are utilized at the juncture of the side beams 130 and 132 with the respective legs 120 and 122. A cover plate 145 extends across the truss structure between the beams 123 and 124 adjacent the rear wall 29 of the body and is secured to both the rear wall 29 and the channel 33, as well as to the side beams 123 and 124. This cover plate extends rearwardly to a position above the torque tube 119 and has an extent such that it affords protection for the rear door operating mechanism and other operating parts which are covered thereby.

As may be observed in various views of the drawings, the laterally extending members of the truss structure, such as the torque tube 119 and the bumper beam 125 have a height considerably above the stub axles upon which the wheels are mounted and afford clearance for a load dumped from the body and which has assumed its normal spread. It may also be observed that the wheels at the rear of the vehicle are located so that they are not only laterally outside of the position of the load as it is dumped and as its spread is restricted by the dropped bottom doors, but they are also close to the rear end of the body, so that they can pass along the outside portions of the dumped load before it has spread much beyond the limits of restriction afforded by the dropped doors. If some of the material does spread beyond the doors with sufficient rapidity to get under the rear wheels as the vehicle is moved away from the dumped load, the material will have a tendency to raise the level of the wheels and thereby afford further clearance for movement of the vehicle over the top of the load.

From the foregoing description taken in reference to the accompanying drawings, it may be understood that I have provided a bottom dump load hauling vehicle which, in the present instance, is disclosed as being in the form of a tractor drawn trailer unit which, in addition to providing bottom doors and an operating mechanism therefor, provides for quick dumping of large loads from the body, and also has an opening in the lateral mid region of the rear wall extending to a height sufficient for providing top clearance for dumped loads as the vehicle is moved forwardly away from the dumped load. The disclosed structure further provides a rear door for closing the opening in the lateral mid region of the rear wall for load hauling purposes and embodies an operating mechanism for the bottom and rear doors which effects the opening and closing of those doors in a predetermined sequence suited to effective and efficient dumping and consistent operation.

It is understood that the foregoing description is merely illustrative of a preferred embodiment of the invention and that the scope of the invention is not to be limited thereto but is to be determined by the appended claims.

I claim:

1. A bottom dump load hauling vehicle structure including a body, doors at the bottom of said body swingably connected to said body at the sides of said body, a rear wall in said body, said rear wall having an opening in the lower portion thereof, a rear door swingably connected adjacent its upper edge to said body and extending downwardly to the bottom of said body for closing the opening in said rear wall, biasing means biasing said rear door to an open position and connected to said rear door and to said vehicle structure, cable guide means adjacent the distal edge of said rear door, cables operatively connected to said rear door intermediate the upper and distal edges of said rear door, means connected to said vehicle structure and remote from said rear door for engaging said cables and for alternately inducing tension in and relaxing the tension in said cables, whereby when the tension in the cables is relaxed and the rear door is biased to an open position, the distal edge of said door swings rearwardly and upwardly with respect to the upper edge of said rear door and said cable guide means engage and spread said cables to increase the lateral dimensions of the opening provided in the rear wall.

2. A bottom dump load hauling vehicle structure including a body with movable doors for opening and closing the bottom of the body, means swingably connecting said movable doors to said body for causing them to open downwardly and outwardly of said body, said body including a rear wall provided with an opening in the lateral mid-region thereof extending upwardly to a level substantially above the bottom of the body, a rear door providing a closure for said opening in the rear wall which rear door extends to the bottom of the body when closed, means supporting said rear door adjacent its upper end from said rear wall for swinging movement of the distal margin of said door outwardly and upwardly of said rear wall in a substantially fixed path to and from an open position above said opening, means connected to said rear door and to said vehicle structure for biasing the rear door to said open position, means for closing the rear door against the biasing force of said biasing means, said means for closing said rear door including a pair of cables and cable operating means connected to said vehicle structure, said pair of cables also being connected to said rear door at positions remote from said distal margin of said rear door, and cable guide means at laterally spaced positions on the distal margin of said rear door and releasably engageable with said cables during upward and rearward swinging movements of said distal margin of said rear door for spreading the rear end portions of said cables apart laterally of the body at the region of said opening in said rear wall and above the movable doors in the bottom of said body as the rear door is opened.

3. A bottom dump load hauling vehicle comprising, in combination, a body having side walls and front and rear end walls, a bottom for the body constituting two doors coextensive with the bottom edges of the side walls and each having an outer edge hingedly connected to one of the side walls for swinging movements between an open position in which the doors hang from the side walls and a closed position in which the other edges of the doors are adjacent, means connected to and supporting the body for movement, said rear end wall having the lower part of the mid-region thereof cut away to provide an opening therein which extends upwardly from the bottom, a rear door, hinge means supporting said rear door from said rear end wall for swinging movements in a vertical plane about a horizontal axis for opening and closing said opening in the rear end wall, mechanism for effecting opening and closing movements of the rear door in substantially fixed sequential relationship to the opening and closing movements of said two doors, said mechanism including cables movably engaging and extending longitudinally through guide means on marginal portions of each of said two doors near said other edges of the doors for swinging movements with said other edges of the two doors and for lifting said two doors against gravitational force by tension applied through the cables, said cables each being connected to said rear door and having opposite end portions secured to the body with intermediate regions thereof extending across the lower edge of said rear door to said two doors to exert downward force on the rear door when tension is applied through the cables, resilient means having a fixed connection to the body and a connection to the rear door which moves in relation to the position of the rear door for exerting force therebetween for opening the rear door when the tension in the cables is released, and power operated movable means engaging and exerting force upon the cables at positions remote from the rear door for producing tension in the cables to effect closing movements of the doors.

4. A bottom dump load hauling vehicle comprising, in combination, a body having side walls and front and rear end walls, a bottom for the body constituting two doors coextensive with the bottom edges of the side walls and each having an outer edge hingedly connected to one of the side walls for swinging movements between an open position in which the doors gravitate downwardly and hang from the side walls and a closed position in which the other edges of the two doors are adjacent, means supporting the body for movement, said rear end wall having the lower part of the mid-region thereof cut away to provide an opening therein which extends upwardly from the bottom, a rear door, means supporting said rear door on said rear end wall of the body for movements in a vertical plane between open and closed positions for opening and closing said opening in the rear end wall, mechanism comprising a spring anchored to a part of the vehicle body and connected to the rear door for movements along said door to positions related to the position of said door for biasing said rear door to said open position, cables connected to said rear door and movably engaging said two doors at positions to effect closure of the two doors and act against said spring to close the rear door in response to tension exerted through the cables, movable power operated means engaging said cables at positions spaced from said rear door and said two doors for producing the tension in the cables required for effecting closing movements of the rear door in substantially fixed sequential relationship to the closing movements of said two doors, said movable power operated means also being reversely movable to relieve tension in said cables for effecting gravitational movement of said two doors to their open position and movement of said rear door to the open position by the force of said spring, said means supporting the body for movements including a truss structure extending rearwardly from opposite sides of the body and having stub axles projecting outwardly therefrom on opposite sides of the structure, wheels rotatably mounted on the stub axles exteriorly of the truss structure and to the rear of the body, and said truss structure having lateral cross braces only at a level above the stub axles.

5. A bottom dump load hauling vehicle structure including a body having side walls and front and rear end walls, a bottom for the body constituting two doors coextensive with the bottom edges of the side walls and each having an outer side marginal portion hingedly connected to one of the side walls for swinging movements between a normally open position in which the door gravitates to a position extending downwardly from the side wall to which it is connected and a closed position in which the doors cover the space between the bottom edges of the side walls, means on said vehicle structure for supporting the body for movement, said rear end wall having the lower part of the mid-region thereof cut away to provide an opening therein which extends upwardly from the bottom, a rear door, hinge means at the top of said rear door for supporting said rear door for swinging movements in a vertical plane and relative to said rear end wall between positions for opening and closing said opening in the rear end wall, mechanism for effecting opening and closing movements of the rear door in substantially fixed sequential relationship to the opening and closing movements of said two doors, said hinge means supporting the rear door providing an axis with respect to which said rear door is swingable rearwardly from the rear end wall to an open position, said mechanism for effecting opening and closing movements of the rear door including resilient means having one end anchored to the vehicle structure at a position spaced rearwardly and above the rear door and its other end movably connected to the rear door for biasing the rear door rearwardly away from said opening in the rear end wall to its open position and also means including a link hingedly connected to the vehicle structure for swinging movement about an axis spaced from the axis of the hinge means supporting the rear door for changing the position of application of the biasing force to the rear door as it swings, said mechanism for effecting opening and closing movements of the doors also including flexible force applying means connected to the rear door for moving the rear door against the force of said resilient means, means movably connecting said flexible force applying means to said two doors at fixed positions thereon for effecting operation of said two doors between said open and closed positions, and movable power operated means having movable engagement with a portion of said flexible force applying means in spaced relationship to said two doors and said rear door for effecting operation of the doors by the application and release of forces opposed to the force of gravity on said two doors and the force of said resilient means on said rear door.

6. In a bottom dump load hauling vehicle having a body with movable doors for opening and closing the bottom of the body, said body including a rear wall provided with an opening in the lateral mid-region thereof extending upwardly to a level substantially above the bottom of the body, a rear door providing a closure for said opening in the rear wall which rear door extends to the bottom of the body, hinge means having an axis extending laterally of the body at the top of the opening for movably supporting the rear door relative to said rear wall, means biasing the rear door to an open position wherein it is removed from said opening, power operated means for closing the rear door against the biasing force of the last mentioned means, said rear door having track means secured thereto and extending across the mid-portion thereof in a direction lateral to the hinge axis, roller means mounted for movement along said track means, and said means biasing the rear door to a position removed from the opening comprising a tension spring having one end fixedly anchored to the body and its other end connected to the roller means for movement relative to the rear door as the door moves, thereby to vary the biasing force on the door at different positions thereof.

7. A bottom dump load hauling vehicle structure having a body with movable doors for opening and closing the bottom of the body, said body including a rear wall provided with an opening in the lateral mid-region thereof extending upwardly to a level substantially above the bottom of the body, a rear door providing a closure for said opening in the rear wall which rear door extends to the bottom of the body when closed, means adjacent the upper end of said rear door supporting said rear door from said rear wall for swinging movement of the distal margin of said rear door in a substantially fixed path outwardly and rearwardly to an open position above said opening, means connected to said rear door and to said vehicle structure for biasing the rear door to said open position, means for closing the rear door against the biasing force of the last mentioned means, said means for closing the rear door including a pair of cables and cable operating means connected to said body, said pair of cables being connected to said rear door above the distal margin of said rear door, and cable guide means at laterally spaced positions on the distal margin of said rear door and releasably engageable with said cables during opening swinging movements of said distal margin of said rear door for spreading the rear end portions of said cables apart laterally of the body at the region of said opening in the rear wall whereby the lateral dimensions of the fully open space in the rear wall is increased.

8. In a bottom dump load hauling vehicle, the combination comprising a body having walls defining adjoined bottom and end openings, said bottom opening having a predetermined height level defined by three adjoined walls having bottom edges in substantially the same plane, said end opening extending to a height above said predetermined level which is defined by a wall other than said three, bottom doors hingedly secured to opposed walls of said three for swinging movements toward and from one another about axes extending along bottom portions of said opposed walls for closing and opening said bottom opening, said bottom doors being normally swingable to an open position by the action of gravity, a third door hingedly secured to said wall other than the three and swingable relative thereto about an axis above said end opening for opening and closing the end opening, said third door having a portion adjoining a portion of each of the bottom doors when the doors close the respective openings, and means operatively connected to all of said doors for effecting opening and closing movements of all of said doors, said means for effecting opening and closing movements of all of the doors comprising mechanism including a cable providing an extensible connection between portions of each of the bottom doors remote from the axis of swinging movement thereof and a portion of said third door remote from the hinge axis thereof, together with power operated means having movable engagement with said cable at a position remote from said doors for exerting tension in the cables to close said doors, resilient means acting on the third door to urge said third door to an open position upon release of tension in the cables, and means for correlating the position of the application of the force of the resilient means on the third door to the position of the third door for providing movements of the bottom and third doors in predetermined sequence such that the third door opens after the bottom doors have opened and closes prior to the closing of the bottom doors.

References Cited in the file of this patent

UNITED STATES PATENTS

| | | | |
|---|---|---|---|
| 762,809 | Day | June 14, | 1904 |
| 772,049 | Olcott | Oct. 11, | 1904 |
| 888,793 | Enley | May 26, | 1908 |
| 933,070 | Gleason | Sept. 7, | 1909 |
| 2,102,676 | Byington | Dec. 21, | 1937 |
| 2,230,988 | Alexander | Feb. 11, | 1941 |
| 2,428,533 | Simmons | Oct. 7, | 1947 |
| 2,594,643 | Gustisha | Apr. 29, | 1952 |
| 2,653,845 | Benjamin | Sept. 29, | 1953 |
| 2,732,966 | Schroeder et al. | Jan. 31, | 1956 |
| 2,752,194 | Galloway | June 26, | 1956 |
| 2,760,816 | Kling | Aug. 28, | 1956 |